(12) United States Patent
Ehsani et al.

(10) Patent No.: US 6,922,036 B1
(45) Date of Patent: Jul. 26, 2005

(54) METHOD AND APPARATUS FOR REDUCING NOISE AND VIBRATION IN SWITCHED RELUCTANCE MOTOR DRIVES

(75) Inventors: Mehrdad Ehsani, Bryan, TX (US); Babak Fahimi, Warwick, RI (US)

(73) Assignee: The Texas A&M University System, College Station, TX (US)

( * ) Notice: Subject to any disclaimer, the term of this patent is extended or adjusted under 35 U.S.C. 154(b) by 391 days.

(21) Appl. No.: 09/998,735

(22) Filed: Nov. 30, 2001

Related U.S. Application Data

(60) Provisional application No. 60/250,022, filed on Nov. 30, 2000.

(51) Int. Cl.$^7$ .............................. H02P 1/46; H02P 3/18; H02P 5/28; H02P 7/36
(52) U.S. Cl. ....................... 318/701; 318/138; 318/254; 318/432; 318/439; 318/696; 706/4
(58) Field of Search ................................ 318/254, 700, 318/701, 685, 696, 439, 138, 362, 367, 432; 310/166; 706/4, 20; 702/34

(56) References Cited

U.S. PATENT DOCUMENTS

| | | | | | |
|---|---|---|---|---|---|
| 4,707,650 | A | * | 11/1987 | Bose ........................... | 318/685 |
| 4,933,620 | A | * | 6/1990 | MacMinn et al. ........... | 318/696 |
| 5,168,202 | A | * | 12/1992 | Bradshaw et al. ........... | 318/608 |
| 5,278,482 | A | * | 1/1994 | Bahn ........................... | 318/701 |
| 5,923,141 | A | * | 7/1999 | McHugh ...................... | 318/701 |
| 6,008,601 | A | * | 12/1999 | Sugiyama .................... | 318/254 |
| 6,199,018 | B1 | * | 3/2001 | Quist et al. .................... | 702/34 |
| 6,442,535 | B1 | * | 8/2002 | Yifan ............................ | 706/4 |

OTHER PUBLICATIONS

P. Materu and R. Krishnan, "*Analytical Prediction of SRM Inductance Profile and Steady–State Average Torque*," Department of Electrical Engineering, pp. 214–223, May 1990.

D.A. Torrey and J.H. Lang, "*Modelling a Nonlinear Variable–Reluctance Motor Drive*," IEE Proceedings, vol. 137, Pt. B, No. 5, pp. 314–326, Sep. 1990.

M. Moallem and C.M. Ong, "*Predicting the Torque of a Switched Reluctance Machine From its Finite Element Field Solution*," IEEE Transactions on Energy Conversion, vol. 5, No. 4, pp. 733–739, Dec. 1990.

Julio C. Moreira, "*Torque Ripple Minimization in Switched Reluctance Motors Via Bi–Cubic Spline Interpolation*," PESC '92 Record, 23rd Annual IEEE Power Electronics Specialists Conference, pp. 851–856, Mar. 1992.

Derrick E. Cameron, Jeffrey H. Lang and Stephen D. Umans, "*The Origin and Reduction of Acoustic Noise in Doubly Salient Variable–Reluctance Motors*," IEEE Transactions on Industry Applications, vol. 28, No. 6, pp. 1250–1255, Nov./Dec. 1992.

(Continued)

*Primary Examiner*—David Martin
*Assistant Examiner*—Renata McCloud
(74) *Attorney, Agent, or Firm*—Baker Botts L.L.P.

(57) ABSTRACT

According to one embodiment of the invention, a method includes generating, by a computer, a phase current profile, generating a phase current according to the phase current profile, and applying the phase current to the switched reluctance motor drive. Generating the phase current profile includes initializing one or more first profile parameters which define at least a first portion of the phase current profile. Generating the phase current profile also includes determining whether a first performance criterion is satisfied based on operation of the switched reluctance motor drive using the first profile parameters. Generating the phase current profile also includes updating at least one the first profile parameters if the first performance criterion is not satisfied.

57 Claims, 3 Drawing Sheets

OTHER PUBLICATIONS

Iqbal Husain and Mehrdad Ehsani, "*Torque Ripple Minimization in Switched Reluctance Motor Drives by PWM Current Control*," Ninth Annual Applied Power Electronics Conference and Exposition vol. 1, pp. 72–77, Feb. 13–17, 1994.

Chi–Yao Wu and Charles Pollock, "*Analysis and Reduction of Vibration and Acoustic Noise in the Switched Reluctance Drive*," IEEE Transactions on Industry Applications, vol. 31, No. 1, pp. 91–98, Jan./Feb. 1995.

Piyush Tandon, Anandan Velayutham Rajarathnam and Mehrdad Ehsani, "*Self–Tuning Control of a Switched Reluctance Motor Drive With Shaft Position Sensor*," Conference of Record of the 1996 IEEE Industry Applications Conference Thirty–First IAS Annual Meeting, pp. 101–108, Oct. 6–10, 1996.

B. Fahimi, G. Suresh, J.P. Johnson, M. Ehsani, M. Arefeen and I. Panahi, "*Self–Tuning Control of Switched Reluctance Motors for Optimized Torque per Ampere at all Operating Points*," Thirteenth Annual Applied Power Electronics Conference and Exposition vol. 2, pp. 778–783, Feb. 15–19, 1998.

B. Fahimi, G. Suresh, J. Mahdavi and M. Ehsani, "*A New Approach to Model Switched Reluctance Motor Drive: Application to Dynamic Performance Prediction, Control and Design*," 29th Annual IEEE Power Electronics Specialists Conference, vol. 2, pp. 2097–2102, Aug. 1998.

B. Fahimi, G. Suresh, K.M. Rahman and M. Ehsani, "*Mitigation of Acoustic Noise and Vibration in Switched Reluctance Motor Drive Using Neural Network Based Current Profiling*," Conference of Record of the 1998 IEEE Industry Applications Conference, Thirty–Third IAS Annual Meeting, pp. 715–722, Oct. 12–15, 1998.

\* cited by examiner

METHOD AND APPARATUS FOR REDUCING NOISE AND VIBRATION IN SWITCHED RELUCTANCE MOTOR DRIVES

RELATED APPLICATIONS

This patent application claims the benefit under 35 U.S.C. § 119(e) to U.S. provisional patent application U.S. Ser. No. 60/250,022 filed Nov. 30, 2000, and entitled Method and Apparatus for Reducing Noise and Vibration in Switched Reluctance Motor Drives.

TECHNICAL FIELD OF THE INVENTION

This invention relates in general to switched reluctance motors and, more particularly, to a method and apparatus for reducing noise and vibration in switched reluctance motor drives.

BACKGROUND OF THE INVENTION

Switched reluctance motor (SRM) drives have attracted renewed interest recently due to advancements in power electronic devices, high-speed microcontrollers and advanced control strategies. Positive aspects of SRM drives include their inherent variable speed capability, simple construction, robust performance, and low manufacturing cost. However, SRM drives generally produce high levels of vibration and acoustic noise, which are particularly problematic in introducing SRM technology into domestic applications.

SUMMARY OF THE INVENTION

According to one embodiment of the present invention, a method of reducing noise and vibration in a switched reluctance motor drive is provided. The method includes generating, by a computer, a phase current profile; generating a phase current according to the phase current profile; and applying the phase current to the switched reluctance motor drive. Generating the phase current profile includes initializing one or more first profile parameters that define at least a first portion of the phase current profile. Generating the phase current profile also includes determining whether a first performance criterion is satisfied based on operation of the switched reluctance motor drive using the first profile parameters. Generating the phase current profile also includes updating at least one the first profile parameters if the first performance criterion is not satisfied.

Various embodiments of the present invention may benefit from numerous technical advantages. It should be noted that some embodiments may benefit from some, none, or all of the advantages discussed below.

One technical advantage of some embodiments of the invention is that a phase current profile may be generated that minimizes or reduces the magnitude and/or rate of change of the radial component of the electromagnetic field produced in a switched reluctance motor. Acoustic noise caused by the radial component of force can thus be reduced or minimized.

Another technical advantage of some embodiments is that a phase current profile may be generated that minimizes or reduces the torque ripple or torque pulsation produced in a switched reluctance motor.

Another technical advantage of some embodiments is that the acoustic noise and/or torque ripple can be reduced or minimized while maintaining a desired performance characteristic, such as a desired average torque or rotor speed.

Another technical advantage of some embodiments is that a trained neural network may be used to generate an appropriate phase current profile based on particular inputs, such as desired average torque or desired rotor speed. In some particular embodiments, a neural network may be used to generate an appropriate phase current profile based on a particular combination of input values that is unique from all combinations used in training the neural network.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OP EXAMPLE EMBODIMENTS OF THE INVENTION

Figure 1:
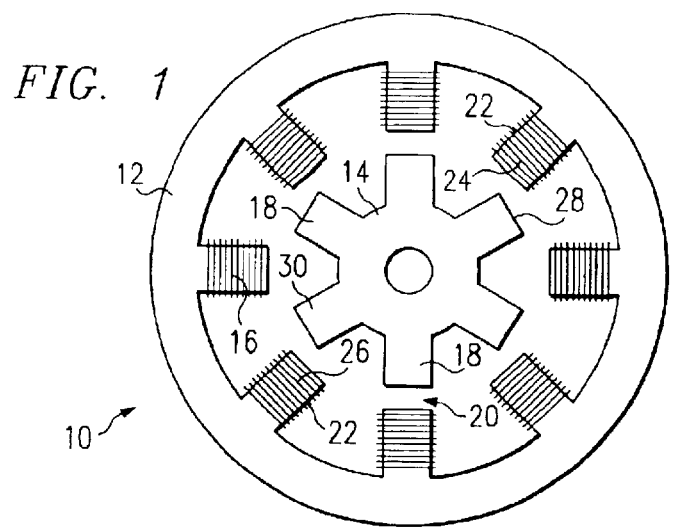
FIG. 1 illustrates a cross-sectional view of a switched reluctance motor.

FIG. 1 illustrates a cross-sectional view of switched reluctance motor 10. Switched reluctance motor 10 includes a stator 12 and a rotor 14 that rotates inside stator 12. Stator 12 includes a plurality of stator poles 16 and rotor 14 includes a plurality of rotor poles 18. As rotor 14 rotates, airgaps 20 separate stator poles 16 from rotor poles 18. Switched reluctance motor 10 shown in FIG. 1 is referred to as an 8/6 SRM since stator 12 includes eight stator poles 16 and rotor 14 includes six rotor poles 18. Other configurations of switched reluctance motors, including a 6/4 SRM, are also commonly used and may benefit from the teachings of the invention.

A winding 22, for example a copper winding, is wound around each stator pole 16. Windings 22 on diametrically opposite pairs of stator poles 16, such as the pair shown as stator poles 24 and 26, are connected in series. Phase currents are sent through windings 22 on pairs of stator poles 16 connected in series, such as stator poles 24 and 26, and are turned on and off based on the angular position of the rotor 14 with respect to the stator 12.

Electromagnetic torque is produced in switched reluctance motor 10 by the attraction of rotor poles 18 to excited stator poles 16. For example, exciting stator poles 24 and 26 by turning on a current through windings 20 on stator poles 24 and 26 creates an electromagnetic force density in airgaps 20. Due to a tangential component of this electromagnetic force density, a rotor pole 28 near stator pole 24 is attracted to stator pole 24. Likewise, a diametrically opposite rotor pole 30 near stator pole 26 is attracted to, and attempts to align itself with, stator pole 26. Thus, an electromagnetic torque is produced, turning rotor 14 counter-clockwise, in this example. As rotor 14 rotates, the phase current running through the pair of stator poles 24 and 26 is turned off at or before the point where rotor poles 28 and 30 are fully aligned with stator poles 24 and 26, respectively. This is done in order to avoid negative torque on rotor 14. In a similar fashion, phase currents which run through pairs of stator poles 16 are repeatedly turned on and off in order to maintain torque on rotor 14.

In addition to the tangential forces on rotor 14, which produce torque, radial forces on stator 12 are also generated. The tangential and radial component of the electromagnetic force density in the airgaps 20 are given by the equations:

$$F_\theta = v_0 \int B_\theta B_r d\theta \qquad (1)$$

$$F_r = v_0 \int (B_r^2 - B_\theta^2) d\theta \qquad (2)$$

where $v_0$, $B_\theta$, $B_r$, and $\theta$ stand for reluctivity of the air in airgap 20, the tangential and radial components of the flux density, and the angular position of rotor 14 respectively. The radial and tangential components of the force for various currents and rotor positions may be calculated using a two-dimensional finite element (FE) method and may be fitted into the following model:

$$F_0 = F_0(i) + F_1(i)\cos(N_r\theta) + F_2(i)\cos(2N_r\theta) \qquad (3)$$

where $N_r$ and i represent the number of rotor poles 18 on rotor 14 and the phase current, respectively. In order to model the effects of saturation, polynomials $F_0$, $F_1$, and $F_2$ can be fitted to numerical values obtained by finite element analysis.

A portion of the acoustic noise generated by switched reluctance motor 10 is caused by stator 12 assuming an oval shape as a result of the radial attraction forces between stator poles 16 and rotor poles 18. By performing a Fourier analysis on the radial component of the force, it can be shown that the frequency of the resulted harmonics are given by:

$$fk = k \frac{nN_r}{30(N_s - N_r)} \qquad (4)$$

where k, n, $N_s$, and $N_r$ represent the kth frequency, the speed of rotor 14 in revolutions per minute, and the number of stator poles 16 and rotor poles 18, respectively. If any of the above frequencies coincide with a natural frequencies of switched reluctance motor 10, a mechanical resonance will occur.

The amplitude of that particular harmonic, on the other hand, is determined by the shape of the radial force. Therefore, the magnitude and rate of change of radial forces are the dominant sources of acoustic noise generated by switched reluctance motor 10.

The radial force reaches its maximum value at aligned positions, i.e., where rotor poles 18 are fully aligned with excited stator poles 16. In operating switched reluctance motor 10, each phase should be turned on when its inductance is increasing and turned off before the rotor reaches an aligned position.

Figure 2:
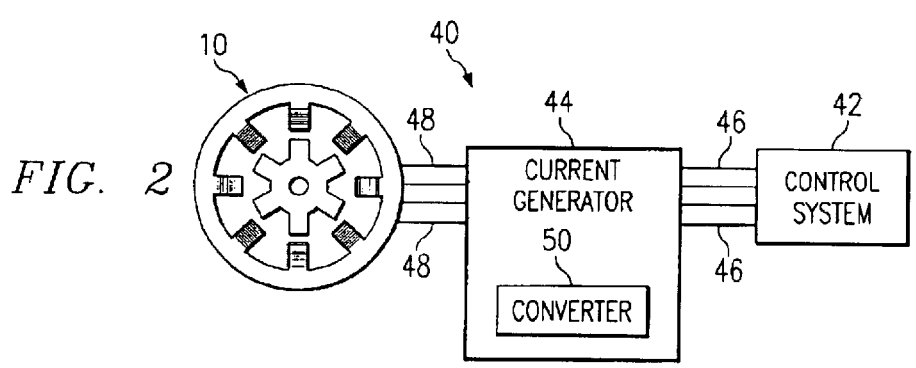
FIG. 2 illustrates a switched reluctance motor system in accordance with the present invention.

FIG. 2 illustrates a switched reluctance motor system 40 in accordance with the present invention. Switched reluctance motor system 40 includes a control system 42, a current generator 44, and switched reluctance motor 10. Control system 42 generates a number of desired phase current profiles (or waveform profiles) 46, the number depending on the configuration of switched reluctance motor 10. For example, in the embodiment shown in FIG. 2, switched reluctance motor 10 is a four-phase motor, and thus control system 42 generates four phase current profiles 46. Control system 42 may be a computer system, a microprocessor, a digital signal processor, or any other type of system able to execute a mathematical algorithm. In particular, control system 42 may be operable to execute the algorithm discussed with reference to FIG. 5.

Control system 42 communicates desired phase current profiles 46 to current generator 44. Current generator 44 generates a phase current 48 based on each phase current profile 46 received from control system 42. Phase currents 48 are then applied to switched reluctance motor 10 to drive rotor 14, as described above with reference to FIG. 1.

In particular, current generator 44 attempts to generate phase currents 48 that perfectly match phase current profiles 46. Current generator 44 may employ a variety of techniques to attempt to generate phase currents 48 perfectly matching phase current profiles 46. For example, current generator 44 may include a converter 50 to approximate each phase current profile 46. In one embodiment, current generator 44 includes a switching power converter 50 that uses a combination of hysteresis control and hard chopping to generate phase currents 48 that approximate phase current profile 46.

Radial attraction between stator poles and rotor poles is the main source of acoustic noise in an SRM. As the rotor turns inside the SRM, radial forces on charged stator poles reach their maximum when the charged stator poles are aligned with rotor poles. This radial force causes the stator to assume an oval shape, which results in acoustic noise. Moreover, in order to avoid generating negative torque, which results in torque ripple or torque pulsation, the phase current is turned off abruptly at or near the aligned position, where radial attraction forces are at a maximum. When the phase current is turned off, the radial attraction between the rotor and stator poles disappears, resulting in a strong outward acceleration of the previously-charged stator poles, which causes additional acoustic noise. Moreover, the gap between stator and rotor poles in an SRM is relatively small, which increases the magnitude of radial attraction forces at aligned positions. Finally, the salient geometry of the stator structure in an SRM magnifies the vibration caused by the radial forces.

According to the teachings of the present invention, a phase current profile is generated that can reduce the acoustic noise generated by a switched reluctance motor. Additionally, a phase current profile can be generated that reduces the torque ripple or torque pulsation generated in a switched reluctance motor.

Figure 3A:
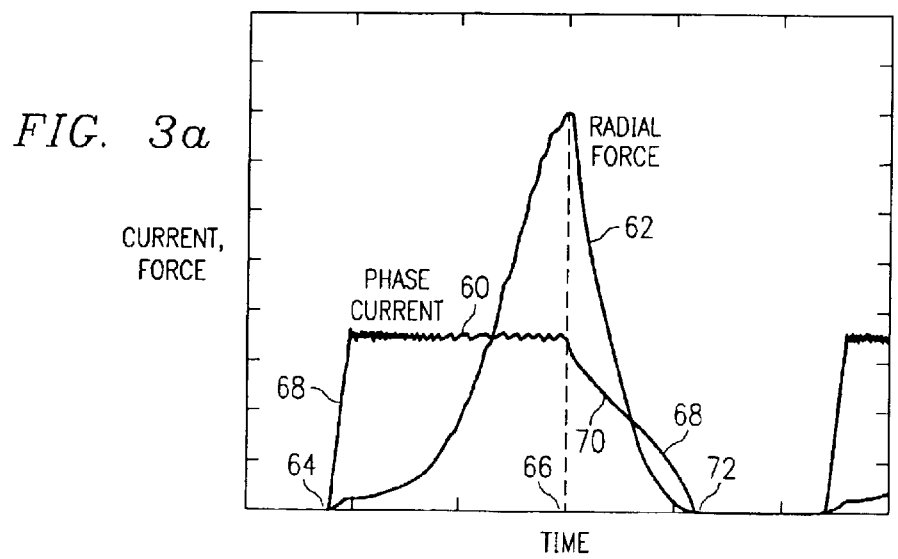
FIG. 3a illustrates a phase current and a radial force as a function of time in a conventional switched reluctance motor.

FIG. 3a illustrates a phase current 60 and radial force 62 as a function of time in a conventional switched reluctance motor. As described above, a number of phase currents are turned on and off repeatedly to turn the rotor in a switched reluctance motor. Phase current 60 can be described by three parameters, namely a turn-on instant 64, a turn-off instant 66, and a shape 68. Turn-on instant 64 is the instant at which phase current 60 is turned on, and turn-off instant 66 is the instant at which phase current 60 is turned off. Phase current 60 includes a tail current 70 due to the natural decay of phase current 60 after phase current 60 is turned off at turn-off instant 66. In other words, phase current 60 does not completely disappear until some time after turn-off instant 66, shown as instant 72. In order to avoid generating negative torque, phase current 60 must be completely eliminated at or before the time of full alignment of rotor poles with stator poles. In other words, instant 72 must occur before full alignment of the poles.

As shown in FIG. 3a, the radial force reaches a maximum at turn-off instant 66 (because turn-off instant 66 is at or near the time of full alignment), but falls extremely rapidly as soon as phase current 60 is turned off at turn-off instant 66. The result is a high rate of change in the radial force that creates undesired acoustic noise in the motor.

Figure 3B:
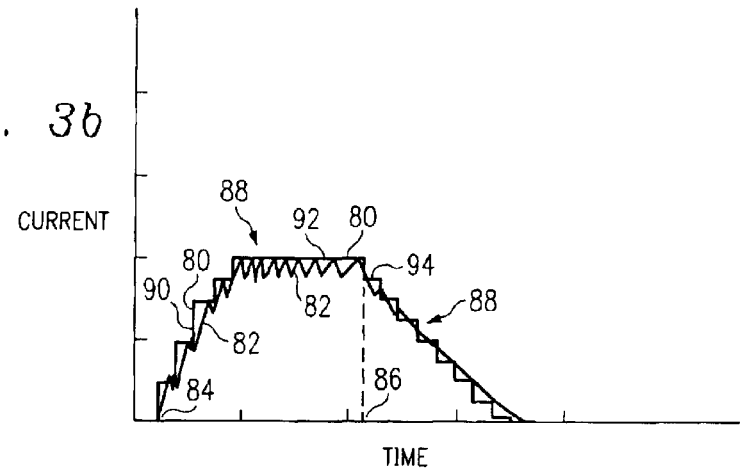
FIG. 3b illustrates a phase current profile determined according to one embodiment of the present invention.

FIG. 3b illustrates a phase current profile determined according to one embodiment of the present invention. A desired phase current profile 80 is determined according to one or more current profiling algorithms as described below. Desired phase current profile 80 is used as a reference for applying a phase current 82 to a switched reluctance motor. In particular, phase current 82 actually applied to the switched reluctance motor is generated according to the desired phase current profile 80. For example, as discussed above with reference to FIG. 2, a phase current generator may employ a variety of techniques to attempt to match phase current 82 with desired phase current profile 80.

The current profiling algorithms are designed to minimize the magnitude and rate of change of the radial component of the electromagnetic force and/or minimize torque ripple, while maintaining one or more defined performance characteristics such as average torque, rotor speed, or motor efficiency. These current profiling algorithms are described in greater detail below.

As discussed with reference to FIG. 3a, desired phase current 80 generated by the algorithms discussed below can be described by three parameters, namely a turn-on instant 84, a turn-off instant 86, and a profile shape 88. Phase current profile 80 includes a current turn-on profile 90, a reference current profile 92, and a current turn-off profile 94. Turn-on profile 90 is the portion of phase current profile 80 between turn-on instant 84 and reference current profile 92. Turn-off profile 94 is the portion of phase current profile 80 after turn-off instant 86. Turn-off profile 94 may be referred to as a tail current. Reference current profile 92 is the portion of phase current profile 80 between turn-on profile 90 and turn-off profile 94. Reference current profile 92 may be a horizontal line representing a constant current over time. In addition, reference current profile 92 may represent the maximum current defined by phase current profile 90.

In one embodiment of the present invention, turn-off profile 94 defines a decay of the phase current from the magnitude of the phase current at turn-off instant 86 to zero, as shown in FIG. 3b. Turn-off profile 94 may define a desired decay that is less rapid or less severe than a natural decay of the phase current. In other words, if the phase current were simply turned off at turn-off instant 86 without subsequent current profiling, the decay of the phase current to zero that would naturally occur would be more rapid than the desired decay defined by turn-off profile 94.

In one embodiment, the desired decay defined by turn-off profile 94 is approximately constant over time. The desired decay may have an approximately constant negative slope when graphed on a current vs. time graph. The desired decay may also include a plurality of steps, as shown in FIG. 3b. The number of steps may be determined by several different factors, such as the number of adaptations of the phase current used in a current profiling algorithm or the speed at that current generation techniques such as hysteresis control and hard chopping can be applied.

Turn-off profile 94 may be determined such that a phase current applied according to turn-off profile produces an approximately constant rate of change in the radial component of electromagnetic force generated in a switched reluctance motor. In one embodiment, turn-off profile 94 is determined such that a constant rate of change of the radial force is produced. Turn-off profile 94 may be used to generate a phase current that produces a rate of change of the radial force which is less than the rate of change which would be naturally produced without current profiling. In this manner, vibration and/or acoustic noise associated with changes in the radial force may be reduced or minimized.

In addition, turn-on profile 90 defines a rise of the phase current from zero to the magnitude of the phase current at the beginning of reference current profile 92, as shown in FIG. 3b. Turn-on profile 90 may define a desired rise that is less rapid or less severe than a natural rise of the phase current. In other words, if the phase current were simply turned on at turn-on instant 84 without subsequent current profiling, the rise of the phase current from zero to the phase current magnitude at the beginning of reference current profile 92 that would naturally occur would be more rapid than the desired rise defined by turn-on profile 90.

In one embodiment, the desired rise defined by turn-on profile 90 is approximately constant over time. The desired rise may have an approximately constant positive slope when graphed on a current vs. time graph. Like the desired decay discussed above, the desired rise may also include a plurality of steps, as shown in FIG. 3b. The number of steps may be determined by several different factors as discussed above regarding the desired decay. In a particular embodiment, the desired rise defined by turn-on profile 90 is approximately a mirror image of the desired decay defined by turn-off profile 94.

Turn-on profile 90 may be determined such that a phase current applied according to turn-on profile produces an less torque ripple or torque pulsation than would naturally be produced without current profiling. In this manner, vibration and/or acoustic noise associated with torque ripple or torque pulsation may be reduced or minimized.

Figure 4:
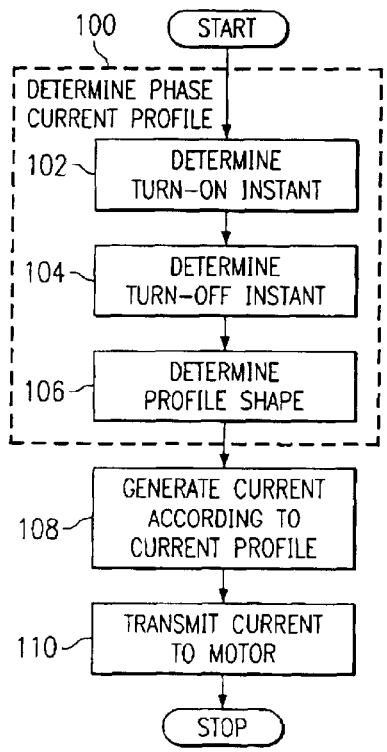
FIG. 4 illustrates a method of applying a phase current to a switched reluctance motor according to a phase current profile.

FIG. 4 illustrates a method of applying a phase current to a switched reluctance motor according to phase current profile 80. In step 100, which includes steps 102, 104 and 106, phase current profile 80 is determined. In particular, in step 102, turn-on instant 82 is determined. In one embodiment, turn-on instant 82 represents an angle between a particular rotor pole and a particular stator pole at which the phase current is turned on. In step 104, turn-off instant 82 is determined. In one embodiment, turn-off instant 82 represents an angle between the particular rotor pole and stator pole at which the phase current is turned off. In step 106, profile shape 88 is determined. Profile shape 86 may represent a portion of, or all of, phase current profile 80. In one embodiment, profile shape 86 includes the shapes of current turn-on profile 90, reference current profile 92, and current turn-off profile 94, respectively.

In step 108, the phase current is generated according to phase current profile 80. Again, as discussed above with reference to FIG. 2, a phase current generator may employ a variety of techniques to attempt to match phase current 82 with desired phase current profile 80. In step 110, the phase current is applied to the switched reluctance motor.

Determining phase current profile 80, as in step 100 of FIG. 4, may be accomplished using one or more current profiling algorithms. In particular, as discussed below with reference to FIG. 5, an algorithm may be used to determine phase current profile 80, or at least a portion of phase current profile 80, which attempts to minimize the radial component of electromagnetic force in the switched reluctance motor.

Figure 5:
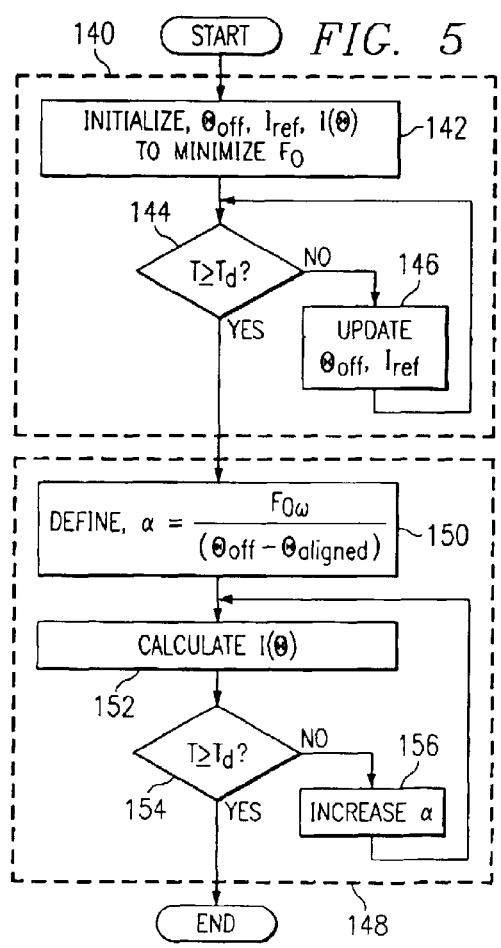
FIG. 5 illustrates an algorithm used to generate a phase current profile according to one embodiment of the present invention.

FIG. 5 illustrates an algorithm that minimizes, or at least reduces with respect to conventional methods, the magnitude and the rate of change of the radial component of the electromagnetic force created in a switched reluctance motor. This is desirable because the magnitude and the rate of change of the radial force are major sources of acoustic noise in a switched reluctance motor, as discussed above with reference to FIG. 1. This algorithm may be executed on any suitable computer, such as a personal computer, workstation, mainframe, or executed in a stand-alone processor or on an Application Specific Integrated Circuit.

The algorithm shown in FIG. 5 is used to determine at least a portion of a phase current profile. Several assumptions are used in this algorithm. First, regarding the magnitude of the radial force, as illustrated with respect to FIG. 3*a*, it is assumed that the maximum magnitude of the radial force occurs at the turn-off instant, when current starts decaying. It is further assumed that adjusting the turn-off instant is a compromise between average output torque and torque ripple. This is due to sensitivity of the generated torque to turn-off instant. In other words, if the turn-off instant is adjusted back in time or rotor angle, torque ripple is decreased, but average output torque is decreased as well. Similarly, if the turn-off instant is adjusted forward in time or rotor angle, average output torque is increased, but torque ripple is increased as well.

According to FIG. 5, the algorithm attempts to reduce or minimize the magnitude of the radial force at step 140. In particular, at step 142, three profile parameters $\theta_{off}$, $I(\theta)$, and $I_{ref}$ are initialized. $\theta_{off}$ represents the rotor angle at which the phase current is turned off, as shown in FIG. 3*b* as turn-off instant 86. $I(\theta)$ represents the portion of the phase current profile after $\theta_{off}$, shown in FIG. 3*b* as turn-off profile 94. $I_{ref}$ represents the profile of the reference current, or maximum current, shown in FIG. 3*b* as reference current profile 92.

When rotor poles are near alignment with excited stator poles, the radial force which can be approximated as:

$$F = k\psi^2(i,\theta) = kL(i,\theta)^2 i^2 \quad (5)$$

where k is a constant defined by motor geometry, $\psi$ is the electromagnetic flux, i is the instantaneous phase current, $\theta$ is the rotor angle, and L is the instantaneous self-inductance of the energized phase.

The profile parameters $\theta_{off}$, $I(\theta)$, and $I_{ref}$ may be initialized to minimize or produce a small maximum radial force magnitude, $F_0$, which can be determined using equation (5), in which $\theta_{off}$ is used for the rotor angle, $\theta_r$ and $I_{ref}$ is used for instantaneous phase current, i.

At step 144, a determination of whether a performance criterion is satisfied based on operation of the switched reluctance motor using the profile parameters as initialized above is made. This determination may be accomplished by comparing a desired performance characteristic an performance characteristic determined by empirical, theoretical, or simulation techniques, or by any other suitable method. For example, in the algorithm shown in FIG. 5, the average torque produced by the switched reluctance motor using the initialized profile parameters $\theta_{off}$, $I(\theta)$, and $I_{ref}$ is calculated based on empirical measurements of an operating motor and compared to a desired average torque, which may be defined by a user.

If it is determined at step 144 that the performance criterion is not satisfied, one or more of the profile parameters is updated at step 146. In the algorithm shown in FIG. 5, one or both of the profile parameters $\theta_{off}$ and $I_{ref}$ may be updated. For example, the values of $\theta_{off}$ or $I_{ref}$ may be increased by a predetermined increment. After updating one or more of the profile parameters at step 146, the algorithm returns to step 144 to determine whether the performance criterion is now satisfied. Thus steps 144 and 146 create a loop which is repeated until the performance criterion is satisfied at step 146.

Thus, by incrementally updating one or both of the profile parameters $\theta_{off}$ and $I_{ref}$ until the performance criterion is satisfied, values for the profile parameters $\theta_{off}$ and $I_{ref}$ are determined which minimize or provide a low or reduced maximum radial force magnitude, $F_0$, in the switched reluctance motor, as compared with conventional switched reluctance motors.

At step 148, the algorithm attempts to reduce or minimize the rate of change of the radial force. In particular, at step 150 another profile parameter is initialized. In the algorithm shown in FIG. 5, a radial force rate of change parameter $\alpha$, which represents the rate of change of the radial force, is initialized. In this embodiment, a uniform rate of change of the radial force is assumed, and thus $\alpha$ is defined as a constant with respect to time as follows:

$$\alpha_i = \alpha = \frac{F_0 \omega}{(\theta_{off} - \theta_{aligned})} \quad (6)$$

where $\omega$ is the angular velocity of the rotor, $\theta_{off}$ is the rotor angle at the turn-off instant, and $\theta_{aligned}$ is the rotor angle at an aligned position between rotor poles and excited stator poles.

In another embodiment, the rate of change for the radial force is not uniform, and thus $\alpha$ is not constant with respect to time. The radial force rate of change parameter $\alpha$ may be initialized with a small value, since one of the objectives of the algorithm shown in FIG. 5 is to reduce or minimize the rate of change of the radial force.

As can be seen from equation (6), the radial force rate of change parameter $\alpha$ is mathematically related to the profile parameters determined above, $\theta_{off}$. In particular, increasing $\theta_{off}$, which causes $\theta_{off}$ to approach $\theta_{aligned}$, decreases the difference between $\theta_{off}$ and $\theta_{aligned}$, which in turn increases $\alpha$. Similarly, increasing $I_{ref}$ increases the maximum radial force, $F_0$, which also increases $\alpha$. Thus $\alpha$ can be increased by increasing one or both of $\theta_{off}$ and $I_{ref}$.

At step 152, the turn-off profile, $I(\theta)$, is calculated. In order to maintain the rate of change in the radial force, $\alpha$, determined in step 150 above, the turn-off profile should follow the following inequality:

$$i(t_i) \geq \left(\frac{1}{L(t_i)}\right)\left(L^2(t_{i-1})i^2(t_{i-1}) - \frac{\alpha_i \Delta t}{k}\right)^{\frac{1}{2}} \quad (7)$$

where $i(t_i)$ is the phase current as a function of time, and $\Delta t$ is the amount of time available for adapting the phase current represented by the turn-off profile, $I(\theta)$. $\Delta t$ can be expressed by:

$$\Delta t = \frac{(\theta_{off} - \theta_{aligned})}{N\omega} \quad (8)$$

where N is the number of adaptations of the phase current. The condition to be satisfied by this algorithm is given by:

$$\sum_i \alpha_i \le \frac{-F_0 N \omega}{(\theta_{off} - \theta_{aligned})} \qquad (9)$$

$$\frac{di}{dt} \le \min_l \left( \frac{i(t_i) - i(t_{i-1})}{\Delta t} \right) \qquad (10)$$

At step 154, similar to step 144, a determination of whether a performance criterion is satisfied based on operation of the switched reluctance motor using the profile parameters as initialized above is made. The performance criterion made be the same criterion or a different criterion within the scope of the present invention. In the algorithm shown in FIG. 5, the same performance criterion, achieving a desired average torque, is used in steps 144 and 154.

If it is determined at step 154 that the performance criterion is not satisfied, the radial force rate of change parameter, α, is updated at step 156. In the algorithm shown in FIG. 5, the value of α is increased, for example by a predetermined increment. After α is updated at step 156, the algorithm returns to step 152 to recalculate the turn-off profile, I(θ), and then to step 154 to determine again whether the performance criterion is now satisfied. Thus steps 152 through 156 create a loop that is repeated until the performance criterion is satisfied at step 154.

Thus, by incrementally increasing the radial force rate of change until the performance criterion is satisfied, a turn-off profile, I(θ), is determined which minimizes or provides a low or reduced rate of change of the radial force generated in the switched reluctance motor, as compared with conventional switched reluctance motors.

It should be noted that as the value of α is increased at step 156, one or both of the profile parameters $\theta_{off}$ and $I_{ref}$ may be increased due to the relationships between α and the parameters $\theta_{off}$ and $I_{ref}$. Thus there are a number of trade-offs or compromises which can be optimized by the algorithm shown in FIG. 5. For example, the rate of change of radial force (represented by α) can be decreased, which may reduce vibration and/or noise caused by changes in the radial force, but decreasing α decreases $\theta_{off}$ or $I_{ref}$, which may decrease average torque produced by the motor.

In addition, another undesirable effect known as torque ripple or torque pulsation may be reduced using an algorithm such as the algorithm shown in FIG. 5. The main source of torque ripple is the timing and profile of the phase current during commutation. The torque ripple can be minimized, or at least reduced with respect to conventional methods, by determining an optimal phase current profile during the turn-on process, defined above as turn-on profile 90.

Torque ripple can be minimized by maximizing the value of the minimum torque generated by the switched reluctance motor. An optimal turn-on profile, $I_{on}(\theta)$, can thus be determined by maximizing the minimum torque, $T_{min}$, in the following equation:

$$T_{min} = T_1(I_1(\theta), \theta) + T_2(I_{on,2}(\theta - 15^\circ), \theta - 15^\circ) \qquad (11)$$

where $T_1(I_1(\theta), \theta)$ is the torque produced by a first phase current during the turn-off process, where $I_1(\theta)$ represents a turn-off profile which has been previously determined, for example using the algorithm shown in FIG. 5, and $T_2(I_{on,2}(\theta-15^\circ), \theta-15^\circ)$ is the torque produced by a second phase current during the turn-on process, where $I_{on,2}(\theta-15^\circ)$, which represents the turn-on profile, $I_{on}(\theta)$, to be determined. An optimal turn-on profile, $I_{on}(\theta)$, can be determined by varying $I_{on}(\theta)$ until a maximum value for the minimum torque, $T_{min}$, is found. The optimal turn-on profile, $I_{on}(\theta)$ can be determined in this manner using an algorithm similar to the algorithm shown in FIG. 5, a trial and error methodology, or by any suitable means. In an ideal case, $I_{on}(\theta)$ is a mirror image of I(θ). However, in practice, equation (11) should be used due to torque-angle characteristics of each motor.

Figure 6A:
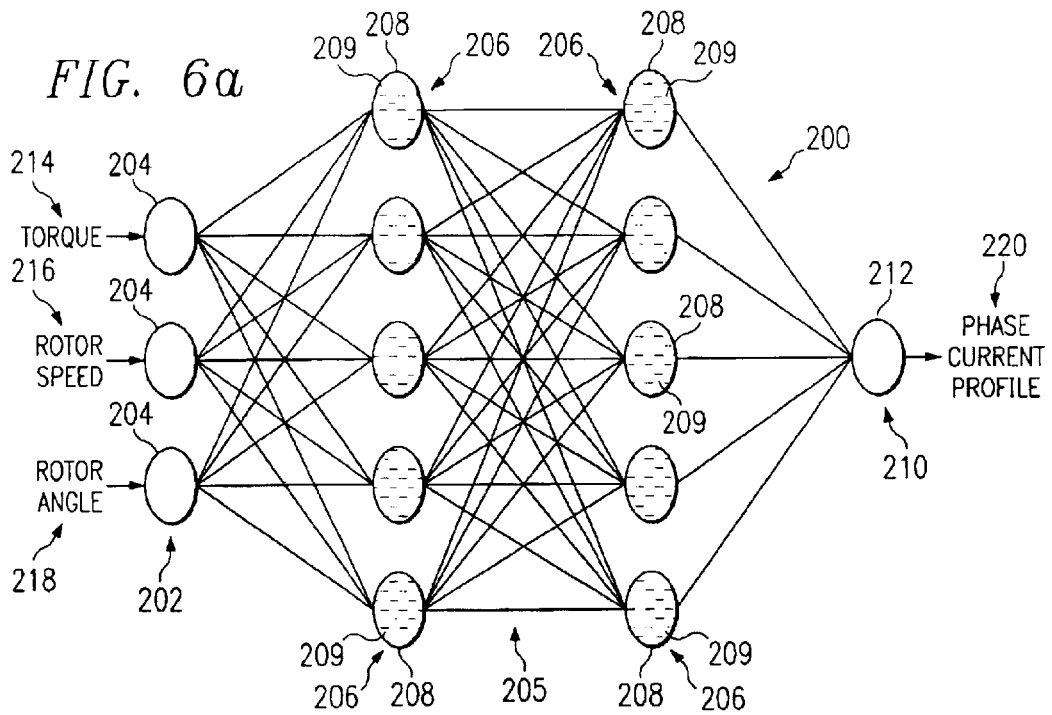
FIG. 6a illustrates a neural network used for adaptive control of a switched reluctance motor in accordance with one embodiment of the present invention.

FIG. 6a illustrates a neural network 200 used for adaptive control of switched reluctance motors in accordance with one embodiment of the present invention. Neural network 200 may be a feedforward artificial neural network. In particular, neural network 200 may include an input layer 202 having one or more inputs 204, one or more hidden layers 206 each having one or more neurons 208, and an output layer 210 having one or more outputs 212. Inputs 204, neurons 208, and outputs 212 are connected by a network 205. In addition, each neuron 208 has an associated mathematical weight 209. In the embodiment shown in FIG. 6a, neural network 200 includes an input layer 202 having three inputs 204, two hidden layers 206 each having five neurons 208, and an output layer 210 having one output 212. Inputs 204 include a torque input 214, a speed input 216, and an angle input 218, and output 212 is a current profile output 220.

The activation function of neurons 208 in hidden layers 206 may be a tan-hyperbolic function as given by:

$$f(s_j) = \tanh(s_j) \qquad (12)$$

$$s_j = b_j + \sum_{i=1}^{n} x_i w_{ij} \qquad (13)$$

where s is the input to the current layer, i is the index of the previous layer, j is the index of the current layer, $w_{ij}$ is the synaptic weight matrix between the current layer and the previous layer, and $b_j$ is the bias for the current layer.

Neural network 200 is trained by determining the mathematical weights 209 associated with neurons 208 in neural network 200. This may be accomplished using a back propagation learning algorithm. In one embodiment, neural network 200 is trained using data from a computer simulation. In another embodiment, neural network 200 is trained using data obtained from empirical measurements.

Figure 6B:
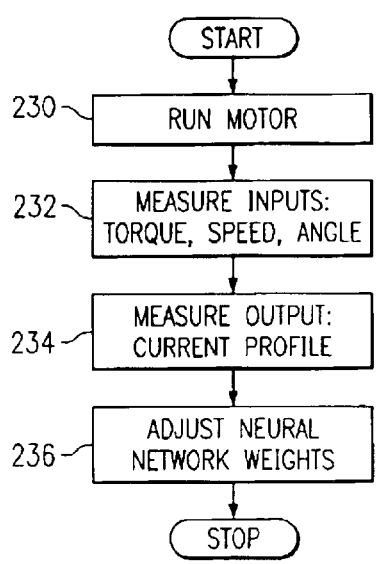
FIG. 6b illustrates a method of training a neural network in accordance with the present invention.

FIG. 6b illustrates a method for training neural network 200 in accordance with the present invention. At step 230, a switched reluctance motor is operated at a particular operating point. The operating point can be defined by the combination of input values used while operating the motor.

An algorithm such as the algorithm shown in FIG. 5 is used to generate a phase current profile based on the predetermined input values, such as average torque or rotor speed. As the motor is being operated, the input values are measured at step 232. In particular, an input value may be measured for each input specified in input layer 202 of neural network 200. For example, the average torque, rotor speed, and rotor angle may be continuously measured while operating the switched reluctance motor.

In addition to measuring the input values at step 232, the phase current profile or profiles generated by the algorithm are measured at step 234. In particular, the current turn-on instant, current turn-on profile, reference current profile, current turn-off instant, and current turn-off profile may be measured.

At step 236, the data obtained in steps 232 and 234 are used to train neural network 200. In particular, the data obtained in steps 232 and 234 may be used to calculate or adjust the weights 209 associated with one or more neurons 208. This may be accomplished using a back propagation training algorithm.

As shown in FIG. 6b, steps 230 through 236 is repeated at different operating points. The input and output data obtained at steps 232 and 234 at each operating point may be used to adjust weights 209. In this manner, appropriate weights 209 associated with neurons 208 may be determined such that neural network 200 can output an appropriate phase current profile in response to receiving inputs 204 over a range of input values, as described below with reference to FIG. 6c.

It should be noted that neural network 200 may also be trained using data obtained from theoretical calculations, from a computer simulation, or any other suitable method.

Figure 6C:
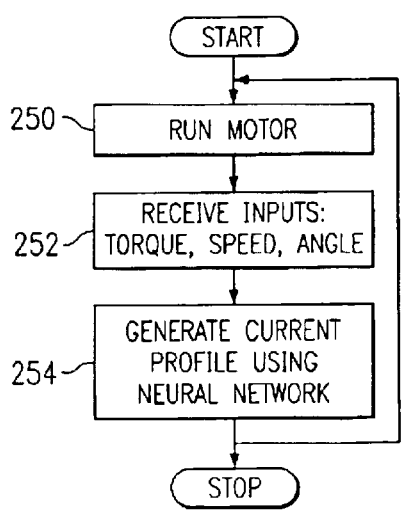
FIG. 6c illustrates a method of determining appropriate phase current profiles over a range of operating points using a neural network.

FIG. 6c illustrates a method of determining appropriate phase current profiles over a range of operating points using neural network 200. At step 250, a switched reluctance motor is operated at a particular operating point defined by a combination of input values, as described above with reference to FIG. 6b. At step 252, the input values are received by neural network 200 as inputs 204. At step 206, an appropriate phase current profile is generated by neural network 200. In other words, neural network 200 determines the appropriate current profile output 220 in response to inputs 204.

Neural network 200 is able to output an appropriate current profile output 220 based on a combination of input values which has previously been used during training of neural network 200, such during the training discussed with reference to in FIG. 6b. In addition, neural network 200 is able to output an appropriate current profile output 220 based on a combination of input values which has not previously been used during training of neural network 200. This may be accomplished by interpolation, extrapolation, or any other technique employed by neural network 200.

Using neural network 200, the algorithms discussed above with reference to FIG. 5 can be applied to an entire range of values for inputs 204. In one embodiment, neural network 200 is used to apply the algorithm shown in FIG. 5 to a portion of a torque-speed plane. In this embodiment, neural network 200 can output an appropriate phase current profile given any combination of the values of two inputs, average torque and rotor speed, as long as those values fall within a specified range. Thus, a user can select a desired average torque and rotor speed, and use neural network 200 to generate an appropriate phase current profile. An appropriate phase current profile may be defined as a profile.

Although an embodiment of the invention and its advantages are described in detail, a person skilled in the art could make various alternations, additions, and omissions without departing from the spirit and scope of the present invention as defined by the appended claims.

What is claimed is:

1. A method of reducing noise and vibration in a switched reluctance motor drive comprising:
   generating, by a computer, a phase current profile by:
      initializing a plurality of profile parameters defining at least a portion of the phase current profile, the profile parameters comprising a current turn-off instant and a current turn-off profile defining the portion of the phase current profile after the current turn-off instant;
      determining whether a desired torque is achieved based on operation of the switched reluctance motor drive using the plurality of profile parameters;
      updating at least one of the plurality of profile parameters if the desired torque is not achieved;
      initializing a radial force rate of change parameter mathematically related to the current turn-off profile;
      calculating the current turn-off profile based on the radial force rate of change parameter;
      determining whether the desired torque is achieved based on operation of the switched reluctance motor drive using the profile parameters, including the current turn-off profile calculated based on the radial force rate of change parameter; and
      updating the radial force rate of change parameter if the desired torque is not achieved;
   generating a phase current according to the phase current profile; and
   applying the phase current to the switched reluctance motor drive.

2. A method of reducing noise and vibration in a switched reluctance motor drive comprising:
   generating, by a computer, a phase current profile by:
      initializing one or more first profile parameters defining at least a first portion of the phase current profile;
      determining whether a first performance criterion is satisfied based on operation of the switched reluctance motor drive using the phase current profile defined at least by the one or more first profile parameters; and
      updating at least one of the one or more first profile parameters if the first performance criterion is not satisfied, including automatically adjusting the at least one first profile parameter by predetermined increments;
   generating a phase current according to the phase current profile; and
   applying the phase current to the switched reluctance motor drive.

3. The method of claim 2, wherein the first profile parameters comprise a current turn-off instant and one or more first profile components, each first profile component defining a portion of the phase current profile.

4. The method of claim 3, wherein the first profile components comprise a reference current profile defining a portion of the phase current profile before the current turn-off instant, and a current turn-off profile defining the portion of the phase current profile after the current turn-off instant.

5. The method of claim 2, wherein the first performance criterion comprises a desired torque.

6. The method of claim 2, further comprising defining a maximum desired magnitude of radial force, and wherein applying the phase current to the switched reluctance motor drive produces a radial force having a magnitude less than or equal to the maximum desired magnitude.

7. The method of claim 2, further comprising defining a maximum desired rate of change of radial force, and wherein applying the phase current to the switched reluctance motor drive produces a radial force having a rate of change less than or equal to the maximum desired rate of change.

8. The method of claim 2, wherein generating the phase current according to the phase current profile comprises approximating the phase current to the phase current profile.

9. The method of claim 8, wherein approximating the phase current to the phase current profile includes approximating the phase current to the phase current profile by hysteresis control and hard chopping.

10. The method of claim 2, wherein determining whether a first performance criterion is satisfied comprises operating the switched reluctance motor drive and empirically measuring a performance characteristic of the switched reluctance motor drive.

11. The method of claim 2, wherein determining whether a first performance criterion is satisfied comprises simulating operation of the switched reluctance motor drive.

12. The method of claim 2, wherein generating a phase current profile further comprises:
   initializing a change parameter mathematically related to at least one of the one or more first profile parameters;
   calculating one or more of the at least one first profile parameters based on the change parameter;
   determining whether the first performance criterion is satisfied based on operation of the switched reluctance motor drive using the one or more first profile parameters, including the one or more first profile parameters calculated based on the change parameter; and
   updating the change parameter if the first performance criterion is not satisfied.

13. The method of claim 12, wherein the one or more first profile parameters comprise a current turn-off profile, wherein the change parameter comprises a radial force rate of change parameter mathematically related to the current turn-off profile, and wherein the step of calculating the one or more first profile parameters based on the change parameter comprises calculating the current turn-off profile based on the radial force rate of change parameter.

14. The method of claim 13, wherein the radial force rate of change parameter is a constant.

15. The method of claim 2, wherein determining the phase current profile further comprises:
   initializing one or more second profile parameters defining at least a second portion of the phase current profile;
   determining whether a second performance criterion is satisfied based on operation of the switched reluctance motor drive using the one or more second profile parameters; and
   updating at least one of the one or more second profile parameters if the second performance criterion is not satisfied.

16. The method of claim 15, wherein the one or more first profile parameters comprise a reference current profile, and wherein the one or more second profile parameters comprise a current turn-on profile defining the portion of the phase current profile before the reference current profile.

17. A method of determining a phase current profile for a phase current used in a switched reluctance motor, the method comprising:
   initializing one or more first profile parameters defining at least a first portion of the phase current profile;
   determining whether a first performance criterion is satisfied based on operation of the switched reluctance motor drive using the phase current profile defined at least by the one or more first profile parameters; and
   updating at least one of the one or more first profile parameters if the first performance criterion is not satisfied, including automatically adjusting the at least one first profile parameter by predetermined increments.

18. The method of claim 17, wherein the first profile parameters comprise a current turn-off instant, a reference current profile defining a portion of the phase current profile before the current turn-off instant, and a current turn-off profile defining the portion of the phase current profile after the current turn-off instant.

19. The method of claim 17, further comprising:
   initializing a change parameter mathematically related to at least one of the one or more first profile parameters;
   calculating one or more of the at least one first profile parameters based on the change parameter;
   determining whether the first performance criterion is satisfied based on operation of the switched reluctance motor drive using the one or more first profile parameters, including the one or more first profile parameters calculated based on the change parameter; and
   updating the change parameter if the first performance criterion is not satisfied.

20. The method of claim 19, wherein the one or more first profile parameters comprise a current turn-off profile, wherein the change parameter comprises a radial force rate of change parameter mathematically related to the current turn-off profile, and wherein the step of calculating one or more of the at least one first profile parameters based on the change parameter comprises calculating the current turn-off profile based on the radial force rate of change parameter.

21. A switched reluctance motor system comprising:
   a switched reluctance motor and a phase current applied to the switched reluctance motor, the phase current applied according to a phase current profile determined by:
      initializing one or more first profile parameters defining at least a first portion of the phase current profile;
      determining whether a first performance criterion is satisfied based on operation of the switched reluctance motor drive using the phase current profile defined at least by the one or more first profile parameters; and
      updating at least one of the one or more first profile parameters if the first performance criterion is not satisfied, including automatically adjusting the at least one first profile parameter by predetermined increments.

22. The system of claim 21, wherein the first profile parameters comprise a current turn-off instant, a reference current profile defining a portion of the phase current profile before the current turnoff instant, and a current turn-off profile defining the portion of the phase current profile after the current turn-off instant.

23. The system of claim 21, wherein the phase current profile according to which the phase current is applied is further determined by:
   initializing a change parameter mathematically related to at least one of the one or more first profile parameters;
   calculating one or more of the at least one first profile parameters based on the change parameter;
   determining whether the first performance criterion is satisfied based on operation of the switched reluctance motor drive using the one or more first profile parameters, including the one or more first profile parameters calculated based on the change parameter; and
   updating the change parameter if the first performance criterion is not satisfied.

24. The system of claim 23, wherein the one or more first profile parameters comprise a current turn-off profile, wherein the change parameter comprises a radial force rate of change parameter mathematically related to the current turn-off profile, and wherein the step of calculating one or more of the at least one first profile parameters based on the change parameter comprises calculating the current turn-off profile based on the radial force rate of change parameter.

25. A switched reluctance motor system comprising:
   a switched reluctance motor and a phase current applied to the switched reluctance motor according to a desired phase current profile, the desired phase current profile comprising a current turn-off instant defining a desired instant at which the phase current is turned-off and a current turn-off profile defining a desired decay of the magnitude of the phase current from the magnitude of the phase current at the current turn-off instant to zero, wherein the desired decay is less rapid than a natural decay of the phase current.

26. The switched reluctance motor system of claim 25, wherein applying the phase current to the switched reluctance motor generates a radial force, and wherein applying the phase current according to the desired phase current profile provides an approximately constant rate of change of the radial force after the current turn-off instant.

27. The switched reluctance motor system of claim 25, wherein the desired decay is approximately constant over time.

28. The switched reluctance motor system of claim 27, wherein the desired decay comprises a plurality of decay steps.

29. The switched reluctance motor system of claim 25, wherein the current turn-off profile has an approximately constant negative slope.

30. The switched reluctance motor system of claim 29, wherein the approximately constant negative slope is defined by a plurality of steps.

31. The switched reluctance motor system of claim 25, wherein the desired phase current profile further comprises a current turn-on profile defining a desired rise of the phase current from zero to a reference magnitude, wherein the desired rise is less rapid than a natural rise of the phase current.

32. The switched reluctance motor system of claim 31, wherein applying the phase current to the switched reluctance motor generates torque pulsation, and wherein applying the phase current according to the desired phase current results in less torque pulsation than would result from a natural rise of the phase current.

33. The switched reluctance motor system of claim 31, wherein the desired rise is approximately constant over time.

34. The switched reluctance motor system of claim 31, wherein the desired rise comprises a plurality of rise steps.

35. The switched reluctance motor system of claim 31, wherein the desired rise is approximately a mirror image of the desired decay.

36. A control system for use in a switched reluctance motor system, the control system operable to determine a phase current profile for a phase current used in switched reluctance motor, the phase current profile determined by:
   initializing one or more first profile parameters defining at least a first portion of the phase current profile;
   determining whether a first performance criterion is satisfied based on operation of the switched reluctance motor drive using the phase current profile defined at least by the one or more first profile parameters; and
   updating at least one of the one or more first profile parameters if the first performance criterion is not satisfied, including automatically adjusting the at least one first profile parameter by predetermined increments.

37. The system of claim 36, wherein the first profile parameters comprise a current turn-off instant, a reference current profile defining a portion of the phase current profile before the current turn-off instant, and a current turn-off profile defining the portion of the phase current profile after the current turn-off instant.

38. The system of claim 36, wherein the phase current profile determined by the control system is further determined by:
   initializing a change parameter mathematically related to at least one of the one or more first profile parameters;
   calculating one or more of the at least one first profile parameters based on the change parameter;
   determining whether the first performance criterion is satisfied based on operation of the switched reluctance motor drive using the one or more first profile parameters, including the one or more first profile parameters calculated based on the change parameter; and
   updating the change parameter if the first performance criterion is not satisfied.

39. The system of claim 38, wherein the one or more first profile parameters comprise a current turn-off profile, wherein the change parameter comprises a radial force rate of change parameter mathematically related to the current turn-off profile, and wherein the step of calculating one or more of the at least one first profile parameters based on the change parameter comprises calculating the current turn-off profile based on the radial force rate of change parameter.

40. A control system for use in a switched reluctance motor system, the control system operable to determine a desired phase current profile for generating a phase current used in switched reluctance motor, the desired phase current profile comprising a current turn-off instant defining a desired instant at which the phase current is turned-off and a current turn-off profile defining a desired decay of the magnitude of the phase current from the magnitude of the phase current at the current turn-off instant to zero, wherein the desired decay is less rapid than a natural decay of the phase current.

41. The control system of claim 40, wherein applying the phase current to the switched reluctance motor generates a radial force, and wherein applying the phase current according to the desired phase current profile provides an approximately constant rate of change of the radial force after the current turn-off instant.

42. The control system of claim 40, wherein the desired decay is approximately constant over time.

43. The system of claim 40, wherein the current turn-off profile has an approximately constant negative slope.

44. The system of claim 40, wherein the desired phase current profile further comprises a current turn-on profile defining a desired rise of the phase current from zero to a reference magnitude, wherein the desired rise is less rapid than a natural rise of the phase current.

45. The system of claim 44, wherein applying the phase current to the switched reluctance motor generates torque pulsation, and wherein applying the phase current according to the desired phase current results in less torque pulsation than would result from a natural rise of the phase current.

46. The system of claim 44, wherein the desired rise is approximately constant over time.

47. The system of claim 44, wherein the desired rise is approximately a mirror image of the desired decay.

48. A switched reluctance motor system comprising:
   a switched reluctance motor;
   a neural network comprising a plurality of neurons connected by a network, each neuron having an associated weight, wherein the neural network is operable to receive one or more inputs and to output a desired phase current profile based on the inputs and the weights, the desired phase current profile comprising:
      a current turn-off instant defining a desired instant at which the phase current is turned off; and
      a current turn-off profile defining a desired decay of the magnitude of the phase current from the magnitude of the phase current at the current turnoff instant to zero, wherein the desired decay is less rapid than a natural decay of the phase current; and a phase current applied to the switched reluctance motor according to a phase current profile output by the neural network.

49. The switched reluctance motor system of claim 48, wherein the neural network comprises a plurality of layers including an input layer operable to receive the one or more inputs, one or more hidden layers each comprising one or more neurons, and an output layer operable to output the desired phase current profile.

50. The switched reluctance motor system of claim 49, wherein the neural network comprises two hidden layers each comprising five neurons.

51. The switched reluctance motor system of claim 48, wherein the neurons are activated using a tan-hyperbolic activation function.

52. The switched reluctance motor system of claim 48, wherein the one or more inputs comprise a torque input and a rotor speed input.

53. The switched reluctance motor system of claim 52, wherein the inputs further comprise an rotor angle input.

54. The switched reluctance motor system of claim 52, wherein the neural network is operable to output a desired phase current profile for a plurality of operational points on a torque-speed plane.

55. The switched reluctance motor system of claim 48, wherein the neural network is trained by a back propagation technique.

56. The switched reluctance motor system of claim 48, wherein the neural network is trained by determining the weights associated with each neuron, wherein the weights are determined by:

operating the switched reluctance motor at a plurality of operating points, each operational point associated with a combination of test input values corresponding to the one or more inputs;

obtaining input data and output data from the operation of the switched reluctance motor at each operating point; and calculating the weights using the input data and the output data.

57. The switched reluctance motor system of claim 56, wherein each of the one or more inputs has an input value, and wherein the neural network is operable to determine by interpolation a desired phase current profile for a combination of input values unique from the combinations of test input values used in determining the weights.

* * * * *